US012711242B2

(12) United States Patent
Schwartz et al.

(10) Patent No.: US 12,711,242 B2
(45) Date of Patent: Aug. 18, 2026

(54) TECHNIQUES FOR SOFTWARE CONTAINER REMEDIATION

(71) Applicant: Dazz, Inc., Palo Alto, CA (US)

(72) Inventors: Tomer Schwartz, Tel Aviv (IL); Barak Bercovitz, Even-Yehuda (IL); Pavel Resnianski, Tel Aviv (IL); Ori Vider, Petah Tikva (IL); Eshel Yaron, Amsterdam (NL)

(73) Assignee: Wiz, Inc., New York, NY (US)

( * ) Notice: Subject to any disclaimer, the term of this patent is extended or adjusted under 35 U.S.C. 154(b) by 43 days.

(21) Appl. No.: 18/772,928

(22) Filed: Jul. 15, 2024

(65) Prior Publication Data

US 2026/0017383 A1 Jan. 15, 2026

(51) Int. Cl.
*G06F 21/57* (2013.01)

(52) U.S. Cl.
CPC ...... *G06F 21/577* (2013.01); *G06F 2221/033* (2013.01)

(58) Field of Classification Search
CPC .......................... G06F 21/577; G06F 2221/033
See application file for complete search history.

(56) References Cited

U.S. PATENT DOCUMENTS 5,715,403 A 2/1998 Stefik
10,002,247 B2 6/2018 Suarez et al.
10,032,032 B2 7/2018 Suarez et al.
10,169,209 B2 1/2019 McPherson et al.
10,324,708 B2 * 6/2019 Griffin ...................... G06F 8/63
10,719,345 B2 7/2020 Du et al.
10,725,775 B2 7/2020 Suarez et al.
10,831,474 B2 11/2020 Azagury et al.
10,936,293 B2 3/2021 Varadharajan Kannan
11,151,024 B2 * 10/2021 Hwang ............... G06F 11/3024
11,487,530 B2 * 11/2022 Suarez ................ G06F 9/45558
11,656,893 B2 5/2023 Song et al.
11,789,723 B2 10/2023 Suarez et al.
11,917,003 B2 2/2024 Spillane et al.
12,093,384 B1 * 9/2024 Oliver ..................... G06F 21/53
2017/0068676 A1 3/2017 Jayachandran et al.
2018/0129479 A1 5/2018 Mcpherson et al.
2018/0309747 A1 * 10/2018 Sweet ................. G06F 9/45558
2019/0114164 A1 4/2019 Wong et al.
2019/0121986 A1 * 4/2019 Stopel ................... G06F 21/577
(Continued)

OTHER PUBLICATIONS

International Search Report for PCT/IB2025/056416, dated Sep. 21, 2025. Searching Authority, Israel Patent Office, Jerusalem, Israel.
(Continued)

*Primary Examiner* — Meng Li
(74) *Attorney, Agent, or Firm* — M&B IP Analysts, LLC

(57) ABSTRACT

A system and method for software container remediation. A method includes determining that a vulnerability of a software container resides in a first origin image of the software container at least partially by identifying a plurality of derived container images referencing the origin image which have the vulnerability, wherein a first derived container image of the plurality of derived container images is used to run the software container; and rebuilding the first derived container image using contents of a second origin image, wherein the second origin image avoids the vulnerability.

19 Claims, 5 Drawing Sheets

(56) References Cited

U.S. PATENT DOCUMENTS

| | | | | |
|---|---|---|---|---|
| 2020/0097662 | A1* | 3/2020 | Hufsmith | H04L 9/0643 |
| 2020/0125731 | A1* | 4/2020 | Benameur | G06F 8/63 |
| 2021/0019055 | A1 | 1/2021 | Bett et al. | |
| 2021/0124830 | A1* | 4/2021 | Dinh | G06F 21/577 |
| 2021/0173935 | A1* | 6/2021 | Ramasamy | G06F 21/577 |
| 2022/0171856 | A1* | 6/2022 | Bhatt | G06F 21/52 |
| 2022/0382879 | A1* | 12/2022 | Kumar | G06F 21/57 |
| 2023/0036739 | A1* | 2/2023 | Deppisch | G06F 9/45558 |
| 2023/0118939 | A1* | 4/2023 | Malvankar | G06F 9/45558 718/1 |
| 2023/0252157 | A1* | 8/2023 | Pieczul | G06F 21/554 726/25 |
| 2023/0315860 | A1* | 10/2023 | Yaron | G06F 21/577 726/25 |
| 2024/0168744 | A1* | 5/2024 | Mohan | G06F 8/71 |
| 2024/0176888 | A1* | 5/2024 | Sahar-Kaneti | G06F 21/577 |
| 2024/0345822 | A1* | 10/2024 | Mueller | G06F 16/27 |
| 2024/0427901 | A1* | 12/2024 | Gupta | G06F 21/577 |
| 2025/0111035 | A1* | 4/2025 | Knierim | G06F 8/65 |
| 2025/0139250 | A1* | 5/2025 | Manjunath | G06F 21/577 |
| 2025/0220037 | A1* | 7/2025 | Nowak | G06F 21/577 |
| 2025/0272409 | A1* | 8/2025 | McNamee | G06F 21/577 |

OTHER PUBLICATIONS

Written Opinion of the Searching Authority for PCT/IB2025/056416, dated Sep. 21, 2025. Searching Authority, Israel Patent Office, Jerusalem, Israel.

* cited by examiner

TECHNIQUES FOR SOFTWARE CONTAINER REMEDIATION

TECHNICAL FIELD

The present disclosure relates generally to software container cybersecurity, and more specifically to fixing vulnerabilities in software container images.

BACKGROUND

A software container is a unit of software including a package of code and dependencies that can be utilized to quickly and easily deploy applications in computing environments. A software container may be realized via a container image, which is an executable package of software containing all data needed to run a given application such as code, runtime, system tools, system libraries, settings, and the like. At runtime, a container image is executed in order to cause the application to run.

Changes made to container images may be realized as image layers (also referred to as "layers"), where each layer represents a set of file system changes that modify the container image. These layers are added on top of the base image, which is the original version of the image without any such changes. Layers may be utilized to add libraries, binaries, configuration files, and the like, to be used by the application of the software container. An origin image modified by one or more intermediate image layers may be saved as a new derived image which contains all of the items in the origin image plus any items added via the intermediate layers and/or minus any items removed via the intermediate layers. In this manner, different sets of modifications to the same origin image may be saved as multiple derived images in order to allow for using any of the derived images as a starting point for further image use.

An image for a software container may be defined to include a first layer before subsequent changes are made to the image via further layers. This origin image including the first layer may be a read-only file defining a minimum set of software to be used for running a given containerized application including changes made via the first layer as a starting point for the software container upon which further changes (realized via additional layers) may be made. To this end, the origin image may be a base image including an empty first layer, or may be a child image which uses content from an existing image (referred to as a parent image) in a first layer including any image layers applied to an origin image of the parent image as the starting point for further modifications. Such a base image may appear as a regular image but, in at least some implementations, only contains the minimum contents to be a functioning image rather than including all of the contents needed to realize an actual containerized application.

In Docker®, a build file known as a Dockerfile defining the first layer image may include a line of code having the text "FROM scratch" for a base image or a line of code having the text "FROM" plus a reference to a directive of a parent image. Definitions in build files may start with a reference to a parent image rather than defining a first layer as an empty base image in order to inherit at least some properties from the parent image instead of starting from scratch. Parent images may themselves act as child images with first layers based on references to further "ancestor" images (e.g., grandparent images, great grandparent images, etc.).

In this regard, a base image may act as a starting point for container-based development workloads, where the base image is only modified via addition of layers (i.e., without modifying the underlying base image). The modifications through one or more layers may be utilized to realize a derived image which includes the contents of the base image as well as any modifications realized via layers.

With the ever-increasing use of software containers in modern computing, techniques for securing computing environment which utilize software containers are always desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for software container remediation. The method comprises: determining that a vulnerability of a software container resides in a first origin image of the software container at least partially by identifying a plurality of derived container images referencing the origin image which have the vulnerability, wherein a first derived container image of the plurality of derived container images is used to run the software container; and rebuilding the first derived container image using contents of a second origin image, wherein the second origin image avoids the vulnerability.

Certain embodiments disclosed herein also include a non-transitory computer readable medium having stored thereon causing a processing circuitry to execute a process, the process comprising: determining that a vulnerability of a software container resides in a first origin image of the software container at least partially by identifying a plurality of derived container images referencing the origin image which have the vulnerability, wherein a first derived container image of the plurality of derived container images is used to run the software container; and rebuilding the first derived container image using contents of a second origin image, wherein the second origin image avoids the vulnerability.

Certain embodiments disclosed herein also include a system for software container remediation. The system comprises: a processing circuitry; and a memory, the memory containing instructions that, when executed by the processing circuitry, configure the system to: determine that a vulnerability of a software container resides in a first origin image of the software container at least partially by identifying a plurality of derived container images referencing the origin image which have the vulnerability, wherein a first derived container image of the plurality of derived container images is used to run the software container; and rebuild the first derived container image using contents of a second origin image, wherein the second origin image avoids the vulnerability.

Certain embodiments disclosed herein include the method, non-transitory computer readable medium, or system noted above, further including or being configured to perform the following step or steps: identifying a vulnerable line of code in a file of the software container, wherein the vulnerable line of code includes a reference to the first origin image; and modifying the vulnerable line of code to include a reference to the second origin image, wherein the first derived container image is rebuilt using the modified line of code.

Certain embodiments disclosed herein include the method, non-transitory computer readable medium, or system noted above, wherein the file of the software container is a build file.

Certain embodiments disclosed herein include the method, non-transitory computer readable medium, or system noted above, further including or being configured to perform the following step or steps: scanning the second origin image to verify that the second origin image avoids the vulnerability.

Certain embodiments disclosed herein include the method, non-transitory computer readable medium, or system noted above, wherein the vulnerability is a first vulnerability of a plurality of vulnerabilities, wherein the second origin image is scanned with respect to the plurality of vulnerabilities, further including or being configured to perform the following step or steps: determining that a risk score for the second origin image is below a threshold based on at least one second vulnerability of the plurality of vulnerabilities detected for the second origin image Certain embodiments disclosed herein include the method, non-transitory computer readable medium, or system noted above, further including or being configured to perform the following step or steps: copying the first derived container image from a repository in which the first derived container image is stored, wherein the rebuilt first derived container image is rebuilt using the copied first derived container image.

Certain embodiments disclosed herein include the method, non-transitory computer readable medium, or system noted above, further including or being configured to perform the following step or steps: creating a hierarchy of container images, wherein the hierarchy of container images includes the plurality of derived container images, wherein the plurality of derived container images referencing the origin image which have the vulnerability is identified based on the hierarchy of container images.

Certain embodiments disclosed herein include the method, non-transitory computer readable medium, or system noted above, further including or being configured to perform the following step or steps: recursively analyzing at least one ancestor container image of the first derived container image to determine whether the vulnerability resides in a respective origin image of each of the at least one ancestor image; and rebuilding each of the at least one ancestor container image for which the vulnerability is determined to reside in the respective origin image.

Certain embodiments disclosed herein include the method, non-transitory computer readable medium, or system noted above, further including or being configured to perform the following step or steps: deploying the rebuilt first derived container image.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
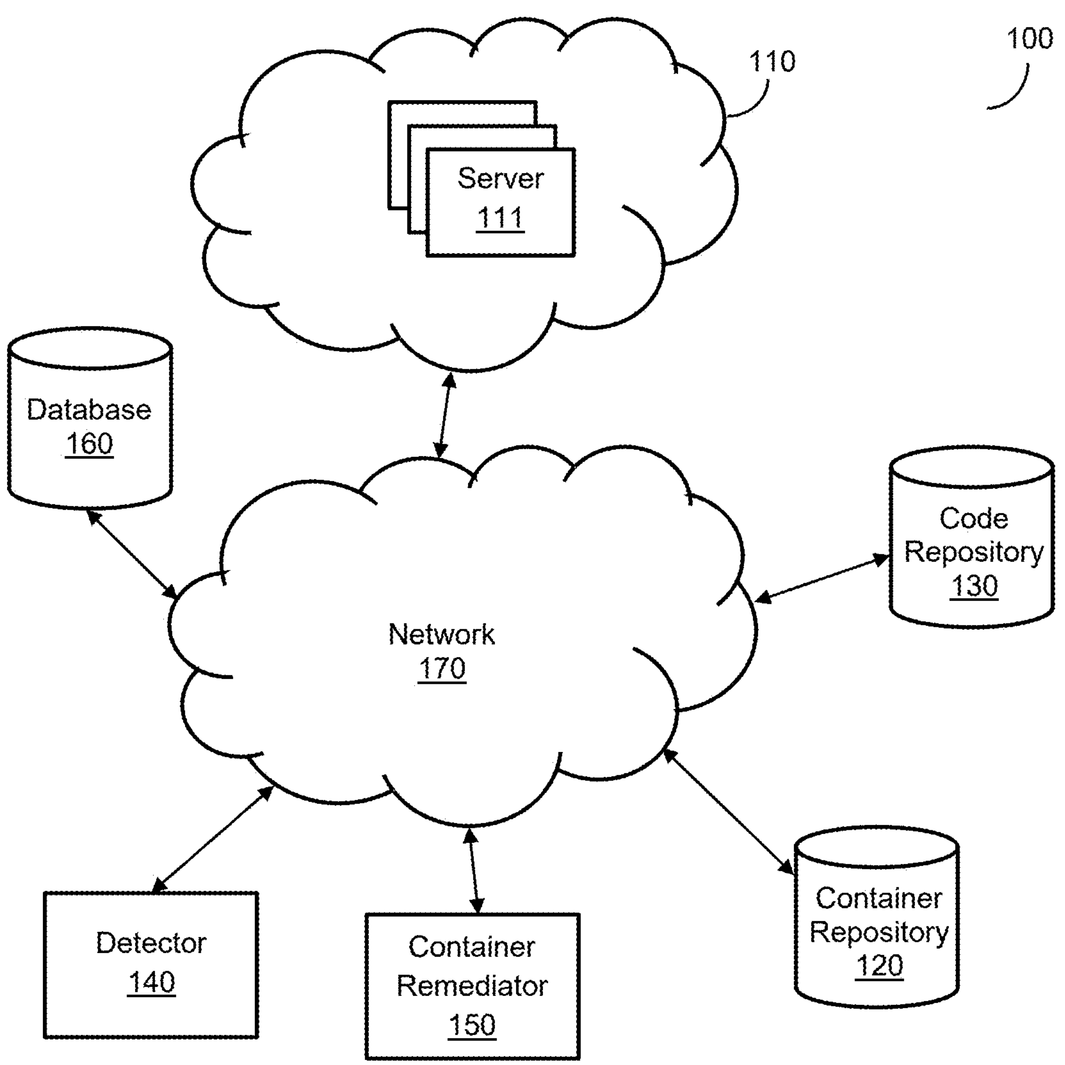
FIG. 1 is a network diagram utilized to describe various disclosed embodiments.

In light of the above, it has been identified that vulnerabilities in origin images of software containers often have cascading effects, where software containers realized using a combination of a vulnerable origin image (e.g., a base image or parent image) and one or more image layers inherit the vulnerabilities of the origin image. Moreover, when a parent image of a child image has its own parent image (i.e., a grandparent image) as a starting point, any vulnerabilities in the grandparent image may be inherited by both the parent image as well as the child image. Accordingly, it has been identified that techniques for detecting vulnerabilities within an origin image would allow for improving cybersecurity in computing environments where that base image is deployed as part of container images. Moreover, techniques for effectively replacing vulnerable origin images with non-vulnerable origin images would further improve cybersecurity.

To this end, the various disclosed embodiments include methods and systems for software container remediation. Various disclosed embodiments include techniques for identifying software container vulnerabilities and remediating such vulnerabilities, for example, by rebuilding and replacing container images with new container images which are reinforced against potential cyber threats. More specifically, various disclosed embodiments include techniques for identifying vulnerabilities in containers caused by origin images (e.g., base images or parent images) and remediating those vulnerabilities by rebuilding the containers with connections to other origin images which will avoid those vulnerabilities. The disclosed embodiments may further be utilized recursively in order to analyze parent images of parent images (i.e., grandparent images), parent images of grandparent images (i.e., great grandparent images), and so on, in order to identify an origin image which might be the root cause of vulnerabilities in many different images.

In accordance with various disclosed embodiments, a location of a vulnerability in a software container is identified. To this end, for a derived image realized as an origin image and one or more image layers which modify the origin image, it may be determined whether the vulnerability exists in the origin image or in one or more of the image layers (e.g., an image layer applied directly to the origin image or applied on top of one or more other layers which are also applied to the same origin image). In this regard, the derived image includes the contents of the origin image modified by the image layers. In some embodiments, subsequent analysis of the vulnerability may differ depending on whether the vulnerability exists in the origin image or in an image layer used to modify origin image.

In an embodiment, when it is determined that the vulnerability exists in the origin image, a vulnerable line in a file of a derived image for that origin image is identified. The derived image for the origin image is an image which is derived from the origin image such that the derive image is a snapshot of the origin image and one or more image layers. In a further embodiment, the vulnerable line is identified by identifying a line (e.g., a "FROM" line) pointing to or otherwise referencing the vulnerable origin image (e.g., by pointing to a specific origin image or by pointing to a location in which the origin image is stored along with any other information used to retrieve the origin image at that location). More specifically, a root cause of the container vulnerability may be determined based on the identified vulnerable line using build file matching. Based on the determined root cause, the derived image is rebuilt in order to replace the vulnerable origin image with updated, current, or otherwise non-vulnerable version of the origin image which avoids the identified vulnerability.

To this end, in some embodiments, rebuilding the derived image includes modifying a line pointing to the vulnerable origin image in order to cause the resulting modified line to point to the updated origin image. That is, in such embodiments, a line in the derived image may be modified in order to point to an origin image which avoids the identified vulnerability, and the image is rebuilt using code including the modified line such that the derived image is rebuilt based on the new origin image rather than the vulnerable origin image. Consequently, a software container run using the rebuilt derived image will lack any vulnerabilities of the vulnerable origin image which are not present in the new origin image.

In some embodiments, to determine whether the vulnerability exists in the origin image, other images may be scanned or otherwise analyzed for the vulnerability. For example, for a vulnerability defined in a particular definition among a set of common vulnerabilities and exposures (CVEs), other images demonstrating the same CVE may be identified. In some further embodiments, when multiple images are spun off or otherwise derived from the same origin image are identified as having the same type of vulnerability (e.g., vulnerabilities sharing a CVE definition), then it may be identified that the vulnerability exists in the origin image.

Moreover, various disclosed embodiments include techniques for replacing vulnerable images. To this end, when a vulnerability is identified as existing in a origin image, a derived image which is derived from the origin image may be rebuilt using a new origin image (e.g., a current or otherwise updated version of the base image which lacks the vulnerability identified in the base image) and deployed into a computing environment while deleting or dismissing the old derived image, thereby replacing the derived image with the rebuilt new derived image. Further, the origin image to be used as the new origin image referenced in the replaced derived image may be scanned or otherwise analyzed to verify that the new origin image will not have the same vulnerability as the old origin image.

Further, in some embodiments, the analysis may further proceed to determine whether the vulnerability in the origin image for the derived image has a root in a further ancestor of the derived image (i.e., an origin image which is referenced in the definition of the vulnerable origin image). In other words, the vulnerable origin image may be analyzed as a child origin image in order to determine whether there is a parent origin image and, when such a parent origin image is identified, it may be determined whether the parent origin image has a vulnerability (for example, using one or more of the processes described herein). The analysis may proceed recursively by identifying a parent origin image for each parent image identified in a prior iteration until a base image is identified as the origin image or otherwise until no parent image is identified during a given iteration.

For example, a parent origin image of a child image which is a derived image of that parent origin image may be identified and analyzed for vulnerabilities, then a grandparent origin image which is a parent of the parent origin image, then a great grandparent origin image which is a parent of the grandparent origin image, and so on. In this manner, all ancestor base images (parents, grandparents, great grandparents, etc.) of a given derived image may be analyzed, and the ancestor origin image which is the root of the vulnerability may be identified. A reference to the ancestor origin image which is the root of the vulnerability may be replaced with a non-vulnerable version of that ancestor origin image (e.g., a reference included in a definition of a child origin image of that ancestor origin image).

The disclosed embodiments therefore allow for remediating vulnerabilities in containers and, more specifically, for more granularly identifying the sources of vulnerabilities, thereby improving cybersecurity of environments secured using the remediation techniques described herein.

FIG. 1 shows an example network diagram 100 utilized to describe various disclosed embodiments. The example network diagram 100 illustrates a cloud computing platform 110 including servers 111 configured to execute containerized applications through an instantiation of one or more software containers. The images of the software containers are stored in a container image repository (or simply a container repository) 120 and their build files are stored in a code repository 130. The software containers can be built and executed in any containerized environment or platform such as, but not limited to, Kubernetes®, Docker®, and the like. The servers 111 may operate in a production environment. The cloud computing platform 110 may be a private cloud, a public cloud, and/or a hybrid cloud.

A software container is a unit of software including a package of code and dependencies that can be utilized to quickly and easily deploy applications in computing environments. A software container may be realized via a container image, which is an executable package of software containing all data needed to run a given application such as code, runtime, system tools, system libraries, settings, and the like. At runtime, a container image is executed in order to cause the application to run.

Changes may be made to a given image via one or more image layers, which define modifications such as additions to or deletions from the image. To this end, a container image may be realized as a derived image which is derived from an origin image and includes one or more image layers applied to the origin image. The origin image may be a base image (e.g., a blank image to be built upon from the ground up), or a parent image (i.e., a foundational image including at least some software container resources). In this sense, a parent image and any changes to the parent image made via a first set of image layers may serve as the origin for a derived image to which further changes may be applied via a second set of image layers.

The image repository 120 maintains a collection of container images used to provide different versions of an application. The image repository 120 may be an integral element of development and deployment practices that make use of containers and PaaS environments. DevOps teams make use of software containers, and most teams pull a variety of container images from numerous sources, such as an open source or a source proprietary to the organization.

DevOps team may build custom container images, optionally using existing ones as layers, and share their source code or container images. An organization will use a container repository to share container images with its team or with the broader repository platform community. It should be noted that the image repository 120 may be a public repository or a private repository that allows an organization to keep its images private within the development team.

Each container image stored in the image repository 120 contains a manifest file, which is a text-based file (e.g., JSON). The manifest file includes information about a container image such as, but not limited to, layers, size, and digest. The manifest file may include a manifest command that gives users additional information such as, but not limited to, the operating system (OS) and architecture an image was built for. A manifest list (.config file) is a list of image layers that is created by specifying one or more (ideally more than one) image names. The manifest may define metadata designating, for example, build information, license information, or any customized data. The data metadata is set by a programmer and may not be accurate or updated. According to an embodiment, a .config layer (hereinafter "configuration file") is retrieved from the manifest for analysis.

At least some of the images stored in the image repository 120 may be derived images which are derived from other images stored in the image repository 120 or stored elsewhere. A first layer of such a derived image may include contents of an origin image in the form of a parent image. When the image is executed, the execution may include retrieving the origin image from the referenced location (e.g., a location in the image repository 120). In accordance with various disclosed embodiments, derived images may be rebuilt and replaced. Rebuilt derived images may be stored in the image repository 120 for subsequent use.

It should be noted that a single image repository 120 is depicted in FIG. 1 for simplicity purposes, but that multiple image repositories may be involved in accordance with various disclosed embodiments. In particular, as discussed below with respect to some embodiments, a container image stored in one repository (e.g., a third-party repository) may be copied into another repository in order to enable rebuilding and/or modification of code for the container image.

The code repository 130 includes the build files of the container images in the image repository 120. The code repository 130 may be a private or public repository. Each build file may contain a set of commands which, when executed, cause creation of a respective container image. For a derived image, the corresponding build file includes a reference to the origin image of the derived image such that the contents of the origin image may be retrieved and utilized as a first layer of the derived image.

Also shown in FIG. 1 is a detector 140 configured to detect vulnerabilities or misconfigurations in software containers executed in the servers 111 or container images stored in the image repository 120. In some embodiments, the detector 140 may be configured to scan origin images for potential vulnerabilities, which may be utilized to determine whether a given origin image has certain vulnerabilities (e.g., vulnerabilities defined in a set of common vulnerabilities and exposures), for example in order to determine whether the root cause of a vulnerability in a derived image is the vulnerability in the origin image, to verify that a new origin image to be used instead of an old origin image lacks certain vulnerabilities of the old origin image, both, and the like.

The container remediator 150 is configured to identify vulnerabilities in software containers in accordance with one or more of the disclosed embodiments. More specifically, the container remediator 150 may be configured to detect sources of vulnerabilities within container images and, in particular, vulnerabilities in origin images.

The container remediator 150 may be further configured to rebuild and replace derived images with new derived images based on new origin images in order to avoid the derived images inheriting vulnerabilities from vulnerable origin images. To this end, the container remediator 150 may be configured to modify build files stored in the code repository 130 in order to replace references to vulnerable origin images with references to origin images which do not have the same vulnerabilities. The container remediator 150 may be further configured to store the modified build files in the code repository 130 and to execute the modified build files in order to rebuild derived images such that they can be deployed, for example, in one of the servers 111.

The container remediator 150 may be further configured to update an inventory (not shown) of container images and their associated build files when a derived file is replaced with a new derived file. Such an inventory may be utilized to identify the build file to be executed when a call to spin up an instance of a given container image is received. The inventory may be a data structure, such as a tree structure stored in a memory of the container remediator 150, or any other storage. In an embodiment, the generated inventory can be saved in storage or in a database 160.

The repositories 120 and 130, the detector 140, the container remediator 150, and the database 160 may communicate via a network 170. The network 170 may be a local area network (LAN), a wide area network (WAN), the Internet, and the like. Further, the repositories 120, 130, the detector 140, the container remediator 150, and/or the database 160 may be hosted in a cloud environment such as the cloud computing platform 110 or a different platform. In some configurations, the container remediator 150 can be integrated in the detector 140 or vice versa (i.e., the detector 140 may be a logical component of the container remediator 150).

It should be understood that the embodiments described herein are not limited to the specific architecture illustrated in FIG. 1, and other architectures or deployment may be equally used without departing from the scope of the disclosed embodiments.

Figure 2:
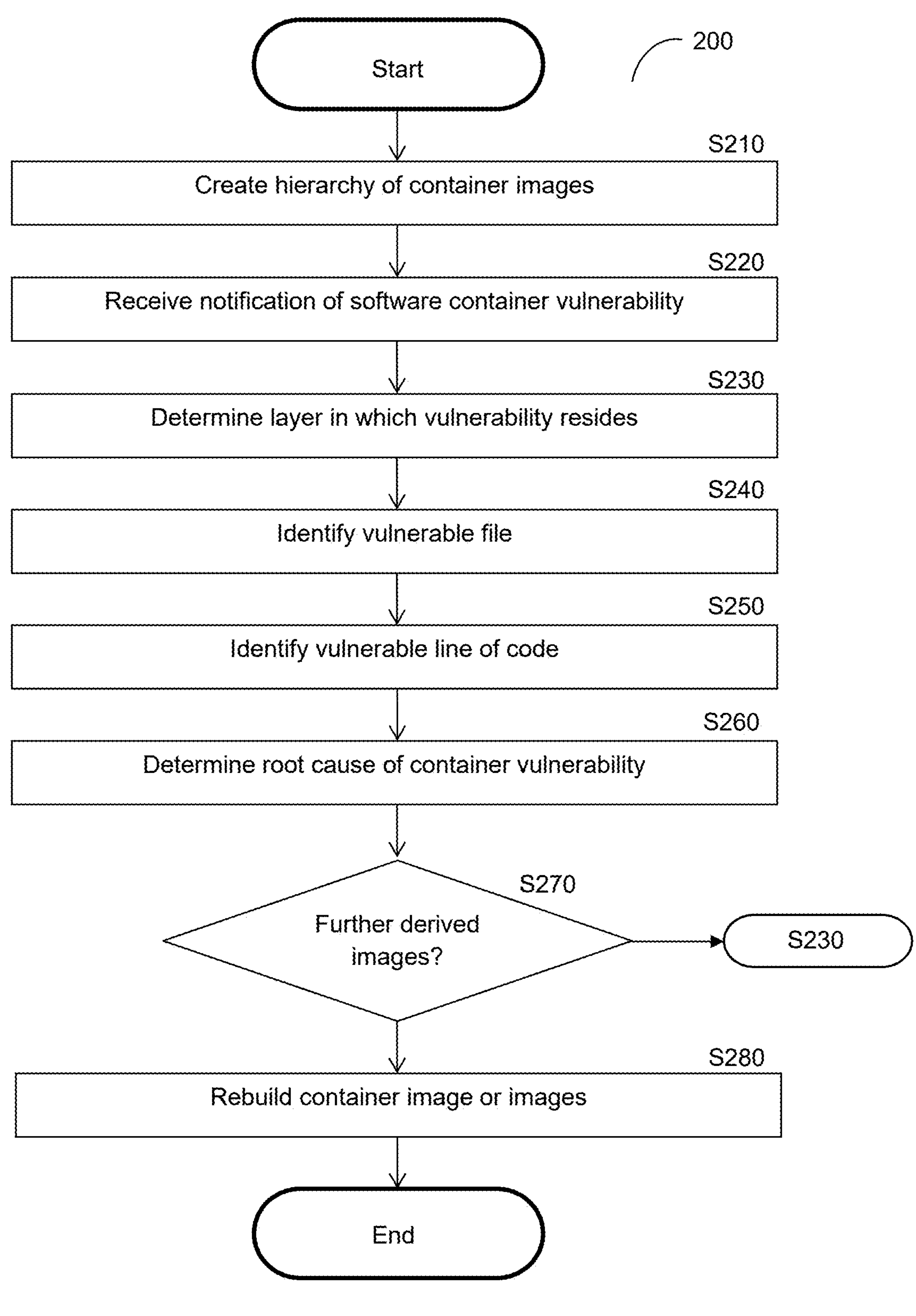
FIG. 2 is a flowchart illustrating a method for software container remediation according to an embodiment.

FIG. 2 is a flowchart 200 illustrating a method for software container remediation according to an embodiment. In an embodiment, the method is performed by the container remediator 150, FIG. 1.

At S210, a hierarchy of container images is created. In an embodiment, the hierarchy is a hierarchical representation of relationships between build files and container images. More specifically, the hierarchical representation may include various series of dependencies between different container images as reflected in connections between build files and container images. The hierarchy may therefore be utilized in order to identify ancestor images as discussed further below. That is, connections represented in the hierarchy may be utilized to determine whether another container image is an origin images for a parent image of a child image (i.e., a child image derived from the parent image) and which container image is such an ancestor image for the derived image analyzed as the child image.

In an embodiment, creating the hierarchy of container images includes creating a hierarchical representation such as, but not limited to, a dependencies tree or graph representing relationships between build files and respective container images. In a further embodiment, creating the dependencies tree includes listing all commands starting from the last command until the first excluded command (or any equivalent command for image creation) is encountered. As a non-limiting example, such an excluded command may be a "FROM" command or other command which references another container image or otherwise indicates an origin image such as a base image or parent image. This process is performed for each candidate build file.

In an embodiment, the list of commands in each candidate build file is matched to a list of commands included in the configuration file. In a further embodiment, when all commands in a candidate build file are mapped to respective commands in the configuration file except for the excluded command(s), then it may be determined that the candidate build file matches that configuration file. In yet a further embodiment, each candidate build file matching a given configuration file is determined to be a build file of the container image associated with that configuration file, and may itself be determined to be associated with that container image.

In this regard, it is noted that, when a container image is formed from multiple build files, an attempt to map a single build file may not allow for accurate matching. That is, multiple build files may be used for a given container image, and only matching one build file to a given container image may lead to inaccurately representing the relationships between build files (e.g., by creating "orphan" build files that are not mapped to container images or otherwise by creating inaccurate mappings for these build files).

Moreover, build files may be related to a given container image in an indirect manner. For example, a build file of a parent image may be separate from a build file of the child image of that parent image even though contents of the parent image build file are incorporated into the child image via derived content of the child image obtained using a reference to the parent image. As child images are utilized as the origin images for further child images (e.g., grandchild images, great grandchild images, etc.), these indirect relationships may become more distant and may not be accurately determined via direct comparison between the configuration files of these subsequent child images and the build files of the further removed ancestor images (e.g., grandparent images, great grandparent images, etc.).

Creating this hierarchical relationship between build files and container images in this manner therefore allows for both mapping multiple build files to a given container image in order to more accurately represent relationships between build files and container images, as well as mapping ancestry across multiple parent-child image relationships. As discussed herein, the hierarchy of container images may be utilized to identify multiple child images having the same vulnerability that have a common parent image (i.e., as indicated via a relationship between a build file of the parent image and a configuration file of the child image). This identification of multiple child images having a common parent image and vulnerability may, in turn, be utilized to determine that a vulnerability has a root cause in an origin image (i.e., the common parent image among the different child images). In other words, multiple child images having the same vulnerability and a common origin image may indicate that the common origin image is the source of the vulnerability, therefore allowing for determining that the vulnerability in each of the child images has a root cause in their common origin image.

By mapping these hierarchical relationships over time, ancestry relationships may be efficiently checked in order to more granularly determine root causes of vulnerabilities in derived images as described herein as well as to more efficiently rebuild and replace vulnerable derived images. That is, this hierarchical relationship may be utilized to identify ancestor images which may be the source of a vulnerability in an origin image of a derived images, therefore allowing for checking each ancestor image for vulnerabilities until an ancestor image having the detected vulnerability is identified without requiring checking all potential ancestor images every time a root cause is to be identified. Even further, as discussed below, when an origin image is stored in a third party repository which is deployed outside of a computing environment in which the corresponding software container is deployed, the analysis of ancestry relationships may include copying origin images for further analysis. By storing these hierarchical relationships as they are discovered, computing resources may be conserved by avoiding re-determining container image ancestry.

At S220, a notification of a vulnerability in a software container is received. The notification may be received, for example, from a cybersecurity tool (e.g., the detector 140, FIG. 1). The notification indicates a software container which is affected by the vulnerability, and may further indicate a type of vulnerability which was detected (e.g., using a definition in accordance with a set of common vulnerabilities and exposures, which defines potential vulnerabilities in a common scheme). In some implementations, the notification may further indicate a specific layer of the software container in which the vulnerability resides. In some implementations, the notification further includes a pointer to a line of code of the software container (e.g., a line of code in a build file of the software container) or other indicator of a specific portion of code which triggered detection of the vulnerability (e.g., a line of code that was determined to be vulnerable during a scan of the build file).

At S230, a layer in which the vulnerability resides is determined. More specifically, in an embodiment, S230 includes determining that the vulnerability resides in the origin image layer rather than another layer of the container image of the vulnerable software container. To this end, in a further embodiment, S230 includes determining whether the vulnerability resides in the origin image layer or a successive layer. The origin image layer is a layer including contents of an origin image. A successive layer is a non-origin image layer that lies on top of the origin image layer (either directly, or on top of other layers which themselves are on top of the origin image layer). In other words, the successive layer makes changes on top of the changes made via the origin image layer.

As noted above, an origin image may be an empty base image or a parent image, and when the origin image is a parent image, any vulnerabilities in the parent image may be inherited by a child image derived from that parent image by virtue of the inheritance of at least a portion of the contents of the parent image.

When the notification indicates a specific layer, that layer may be determined as the layer in which the vulnerability resides. Alternatively, in an embodiment, determining the affected layer may include applying a set of heuristics in order to determine which layer is affected by the vulnerability. More specifically, such heuristics may be designed to allow for determining whether the vulnerability resides in the origin image layer, or in another (non-origin image) layer.

In a further embodiment, determining the layer in which the vulnerability resides includes determining whether that vulnerability lies in multiple container images which are derived from a common origin image (e.g., a common parent image to multiple child images having the same vulnerability). To this end, in yet a further embodiment, determining the layer in which the vulnerability resides further includes identifying an origin image for the container image of the vulnerable software container (i.e., the software container indicated in the notification or otherwise identified as exhibiting a vulnerability). If the origin image is a base image, it may be determined that the layer in which the vulnerability resides is a successive (non-origin image) layer.

In an embodiment, if the origin image for the container image of the vulnerable software container is a parent image, other child images which are derived from the parent image are identified. In a further embodiment, the hierarchy created as discussed above may be analyzed to determine whether any other child images share the parent image in common (i.e., are derived from this same parent image) and which child images are derived from the common parent image. If no other child images are derived from the parent image of the vulnerable software container, it may be determined that the vulnerability resides in a successive (non-origin image) layer. In an embodiment, if other child images are determined as being derived from the parent image of the vulnerable software container, it may further be determined whether the other child images demonstrate the same vulnerability as that demonstrated by the vulnerable software container. To this end, the other child images may be scanned for the vulnerability, or behavior of the software containers realized using the other child images may be analyzed for behavior indicating that vulnerability. This analysis may include applying one or more vulnerability determination rules for determining whether the other child images or the software containers realized using the other child images exhibit the same vulnerability. Alternatively, data from cybersecurity tools indicating the other child images may be analyzed to determine whether the other child images exhibit vulnerabilities and which vulnerabilities are exhibited by the other child images.

In an embodiment, when multiple other child images sharing the common origin image with that of the container image of the vulnerable software container are determined to have the same vulnerability, it is determined that the vulnerability resides in the origin image of that vulnerable software container. That is, when multiple child images derived from the same parent image exhibit the same vulnerability, it may be assumed that the parent image (i.e., the common origin image for those derived child images) is the source of the vulnerability as opposed to other image layers. Accordingly, in such a case, the origin image may be determined as the source of the vulnerability for purposes of subsequent processing.

Moreover, in at least some implementations, multiple layers may be determined as affected by a given vulnerability. In such a case, if one of those affected layers is an origin image layer, it may be determined that the origin image layer is the layer in which the vulnerability resides. In this regard, it is noted that a vulnerability in one layer may cause issues in other layers, particularly layers which are above the layer in which the vulnerability resides. For example, a vulnerability in a first layer may cause an issue in a second layer that makes further changes to the image on top of the changes made by the first layer. For a vulnerability in an origin image layer, the vulnerability in the origin image layer may also cause issues which might appear to be indicative of vulnerabilities in the other layers of the container image. Accordingly, in at least some implementations, when the affected layers include both the origin image layer and one or more other layers, it may be determined that the origin image layer is the layer in which the vulnerability resides for subsequent processing.

At S240, a vulnerable file is identified for the vulnerable software container. More specifically, the vulnerable file may be a build file or other file containing contents to be used for realizing the vulnerable software container. When the vulnerability resides in the origin image, the vulnerable file is identified as a file of the vulnerable software container which includes a reference to the origin image.

In an embodiment, identifying the vulnerable file may include determining an attribution of the vulnerable software container. More specifically, such an attribution may be defined with respect to a file associated with the software container and, more specifically, with a type of file which may include a line of code referencing a container image of another software container (i.e., a reference to an origin image for the software container). In a further embodiment, determining the attribution includes matching candidate build files to configuration files in order to associate one or more build files with each configuration file. More specifically, a build file (such as, but not limited to, a Dockerfile) associated with the configuration file of the vulnerable software container may be identified as the vulnerable file.

An example process for software container attribution which may be utilized to identify the vulnerable file for a vulnerable software container is described further below with respect to FIG. 4.

At S250, a vulnerable line of code within the vulnerable file is identified. In implementations where the notification indicating the vulnerability received at S220 also indicates the vulnerable line, the vulnerable line may be identified as the vulnerable line indicated in the notification. Alternatively, identifying the vulnerable line may include scanning the vulnerable file. More specifically, the build file may be scanned for a line of code indicating a reference to another image (i.e., the origin image). To this end, S250 may include applying vulnerable line identification rules that define one or more aspects of code which are indicative of a reference to another image. In an embodiment, one such aspect may include the inclusion of a "FROM" command in the line of code, which is used to call or otherwise reference another image when included in a build file such as, but not limited to, a Dockerfile.

When the vulnerability is determined to reside in another layer of the container image (i.e., not the origin image layer), other rules may be utilized to identify lines of code other than lines containing a "FROM" command or other reference. To this end, different sets of vulnerable line identification rules may be applied depending on whether the vulnerability resides in the origin image layer or in another layer. As a non-limiting example, for a vulnerability which resides in a non-origin image layer, a line of code including a "COPY" command may be identified as a vulnerable line in at least some implementations.

As a non-limiting example, a build file of a derived container image may include, but is not limited to, the following lines of code:

```
FROM container_ID_123
RUN yum install -y httpd
CMD ["echo", "Web Image created"]
```

In the non-limiting example shown above, the line "FROM container_ID_123" may be identified as the vulnerable line when it was determined that the vulnerability resides in the origin image, and the origin image may be identified based on the identifier "container_ID_123."

At S260, a root cause of the vulnerability in the software container is identified. In an embodiment, the identified root cause is determined as being either the origin image or another part of the software container (e.g., a successive layer on top of the origin image layer).

In a further embodiment, the root cause of the vulnerability for the software container may be more specifically identified with respect to the vulnerable line. That is, when the origin image is the root cause of the vulnerability, the root cause may be further identified with respect to the vulnerable line of code which references the origin image (e.g., a line of code including a "FROM" command which references a parent image). Identifying the root cause with respect to the particular vulnerable line aids in rebuilding the vulnerable derived image of the software container by allowing for modifying the vulnerable line in order to reference a non-vulnerable origin image, thereby allowing for rebuilding the container image of the vulnerable software container in order to avoid the vulnerability by modifying such a reference.

At optional S270, it may be determined whether further derived images are to be analyzed and, if so, execution continues with S230 where the next derived image is analyzed; otherwise execution may proceed with At S280, a container image of the vulnerable software container is rebuilt. As noted above, when the container image is a derived container image which is derived from an origin image, the container image may include a first origin image layer containing contents of the origin image. To this end, rebuilding the container image may include obtaining contents of the applicable origin image and pushing the container image including these contents to a computing environment in which the software container is to be deployed. In some embodiments, the vulnerable software container may be dismissed, the vulnerable container image of the vulnerable software container may be deleted, or both, in order to replace the vulnerable software container with the rebuilt version of the software container (i.e., the software container realized by executing the rebuilt container image).

When derived images are recursively analyzed as discussed with respect to S270, each derived image which was determined to have a root cause in its respective origin image may be rebuilt. In a further embodiment, these derived images are rebuilt recursively in an order based on their relationships. More specifically, the parent image of each derived image (i.e., the other container image which is referenced by that derived image) is rebuilt before that derived image. As a non-limiting example, when recursive analysis yields that a child image has a vulnerability in its parent image, and that the parent image has a vulnerability in its parent image (i.e., the grandparent image of the child image), then the rebuilding may be performed recursively beginning with the grandparent image, then the parent image, then the child image. This order may be utilized such that each image is rebuilt using the updated contents of its respective parent image. When the vulnerability has a root cause embedded via multiple "generations" of origin images, this recursive rebuilding therefore enables fixing the core issue causing the vulnerability.

In this regard, it is noted that, in at least some circumstances, rebuilding a child image using a new parent image may not avoid a vulnerability in the parent image. More specifically, when the parent image inherited the vulnerability from its parent image (i.e., the grandparent image) or from a further ancestor image, then the new version of the parent image may still have the same vulnerability (i.e., if the new parent image still references the vulnerable grandparent, or when the vulnerability resides in a further ancestor image). In such circumstances, only rebuilding the child image using contents of a new parent image may not successfully avoid the vulnerability.

In an embodiment, when the root cause of the vulnerability is determined to be the origin image such that the origin image is determined to be a vulnerable origin image, rebuilding the container image may include modifying the container image to remove a reference to the vulnerable origin image and to add a reference to a non-vulnerable version of the origin image. In a further embodiment, it may be determined whether a vulnerable line in the container image points to a specific origin image or to a location to a repository from which a current version of the origin image should be retrieved.

When the vulnerable line points to a specific origin image, the reference to the vulnerable origin image may be replaced with a reference to a new (e.g., current or updated version) origin image that does not have that vulnerability; otherwise, the container image may be rebuilt without making such a modification. The current or updated version of the base image may be a different version of an origin image having the same identifier but having a later timestamp or version number (e.g., a higher value for such a timestamp or version number than the value of the timestamp or version number, respectively, of the origin image to be replaced).

In yet a further embodiment, when the vulnerable line points to a location in a container repository from which the origin image should be retrieved, the origin image at that location may be scanned for the vulnerability. If it is determined that the origin image at that location lacks this vulnerability, then the container image of the vulnerable software container may simply be rebuilt. In such a case, the rebuilding process would result in obtaining the new version of the origin image, thereby remediating the vulnerability. If it is determined that the origin image has the vulnerability, a notification may be sent (e.g., to a software developer or other owner of the vulnerable origin image) which indicates that the origin image has a vulnerability and should be updated.

A non-limiting example process for rebuilding a container image derived from a vulnerable base image is described further below with respect to FIG. 3.

Figure 3:
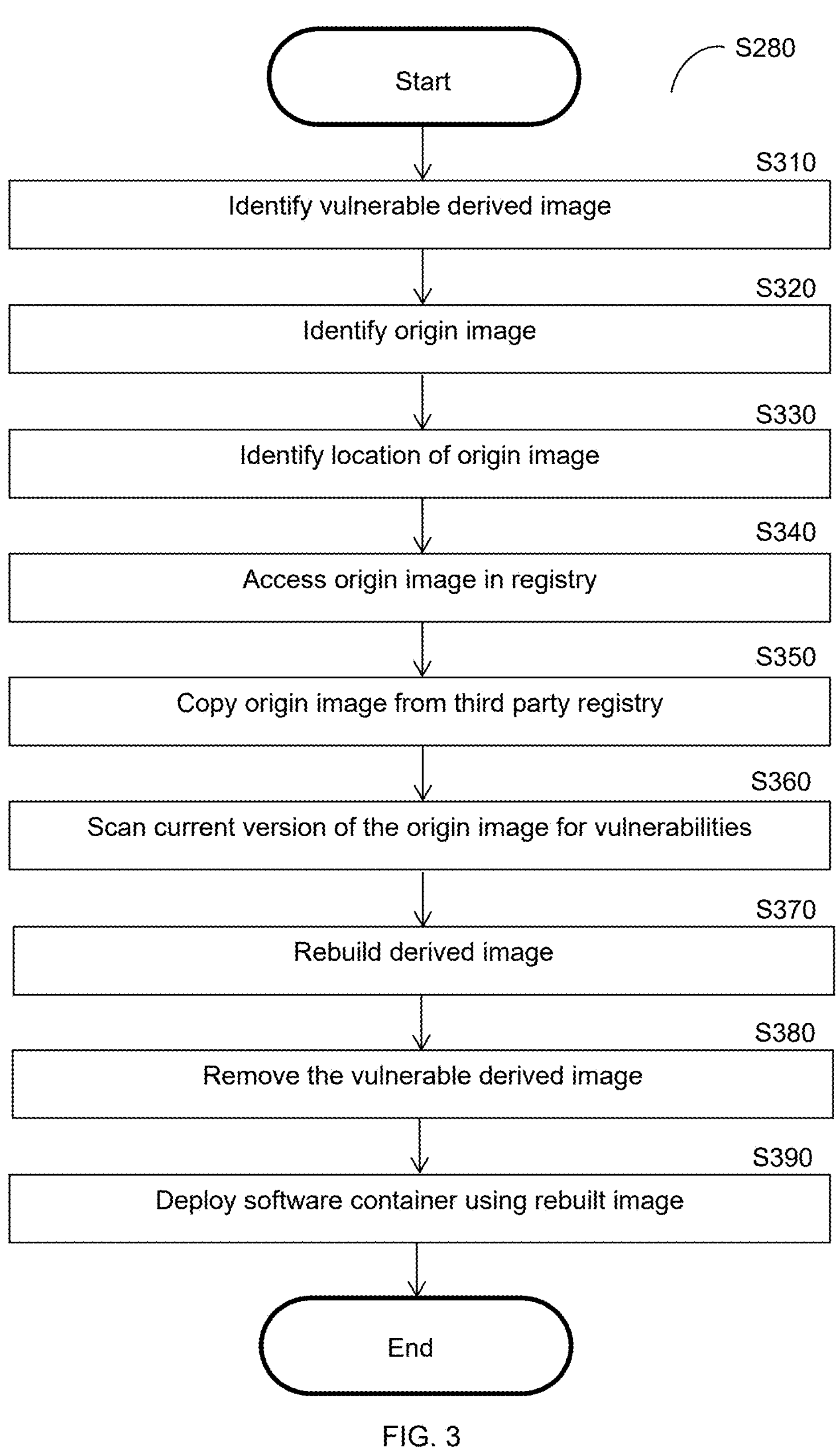
FIG. 3 is a flowchart illustrating a method for replacing a vulnerable base image according to an embodiment.

FIG. 3 is a flowchart S280 illustrating a method for rebuilding a container image according to an embodiment.

At S310, a vulnerable derived image is identified. In an embodiment, the identified derived image is a derived image having a vulnerability which resides in an origin image (i.e., an origin image from which the derived image is derived, such as a parent image from which a derived child image is derived). In a further embodiment, the vulnerable derived image may be identified based on a root cause of the vulnerability identified as discussed above with respect to FIGS. 2 and 260.

At S320, a vulnerable origin image of the derived image is identified. The vulnerable origin image may be an image whose contents are included in a first layer of the derived image and which is referenced in a configuration file of the derived image. More specifically, a vulnerable line of code in the derived image including a pointer or reference to another container image acting as the origin image (e.g., identified as discussed above with respect to S250) may be analyzed in order to identify the referenced origin image. To this end, S320 may include applying one or more referenced origin image identification rules. Such rules may, for example, define structures of lines of code which include references to other images as well as which portions of such structure (e.g., text after "FROM" in the line of code).

An identifier of the referenced origin image may be identified, thereby identifying the vulnerable origin image. Such an identifier may be an identifier of a specific origin image (e.g., a container image having a particular name or other unique identifier that belongs only to that container image, at least in a container repository), or may be an identifier of a location in storage where the referenced origin image may be retrieved from (i.e., in a situation where the reference is not a reference to a specific origin image but, rather, to the current version of whichever image is at this location).

At S330, a location of the vulnerable origin image is identified. More specifically, in an embodiment, the identified location is a repository (e.g., a repository, registry, or portion of a registry including a collection of repositories, for example but not limited to the image repository 120, FIG. 1)) in which the vulnerable origin image is stored and from which its files and other contents (as used by the derived image) came. The location may be identified based on a location of the referenced origin image (i.e., when the reference is to a location in storage), or may be identified by querying one or more repositories based on an identifier of the container image (i.e., in order to determine whether the repository includes a container having this identifier).

In a further embodiment, S330 includes determining whether the location of the vulnerable image is in a repository owned by a given entity (e.g., an entity which operates a computing environment or portion of a computing environment in which the vulnerable software container of the vulnerable derived image is deployed) or in a repository owned by a third party (i.e., another entity). To this end, in yet a further embodiment, S330 may include identifying the repository in which the vulnerable origin image is stored and comparing an identifier of that repository to data indicating registries owned by an entity which operates the environment or portion of the environment in which the vulnerable software container is deployed.

In some embodiments, S330 may further include correlating findings of a detection tool (e.g., a detection tool which detected the vulnerability in the software container such as the detector 140, FIG. 1) with the determined location. Such correlation may be utilized in order to validate the findings of the detection tool, for example, validating that the detection tool accurately identified the software container having the vulnerability.

As discussed further below, subsequent processing may be performed differently depending on whether the origin image is stored in a repository owned by the entity having the vulnerable software container deployed or in a third-party repository. In this regard, it is noted that, because various disclosed embodiments include rebuilding the vulnerable derived image, modifying lines of code defining the container image (i.e., a build file of the container image), or both, the relative location in which the files defining the container image are stored may require different approaches. In particular, when files of a container image are stored in a third-party repository, it may not be possible to rebuild the container image or modify code related to the container image directly in the third-party repository. Accordingly, as discussed below, in some embodiments, the vulnerable derived image may be cloned from a first repository (e.g., the repository of a third-party other than the entity operating the computing environment of the deployed software container) to a second repository (e.g., the repository of the entity operating the computing environment of the deployed software container.

At S340, the origin image is accessed in a repository. More specifically, in an embodiment, the origin image is accessed in the repository identified at S330. The origin image is accessed in order to allow for scanning the origin image, to modify the origin image, both, and the like.

At optional S350, the origin image is copied from a third-party repository. That is, when the repository accessed at S340 is a third-party repository which is not owned or operated by an operator of a computing environment in which the vulnerable software container associated with the vulnerable container image is deployed, the origin image may be copied into another repository which is owned by, operated by, or otherwise accessible to systems on which the rebuilt software container will be run.

At S360, a current or otherwise updated version of the origin image is scanned for potential vulnerabilities. More specifically, this current version of the origin image may be scanned in order to verify that the current version of the origin image avoids the vulnerability. The current version of the origin image will serve as the new origin image for the rebuilt derived image. The current or updated version of the origin image may be, but is not limited to, an origin image having the same identifier but a more recent timestamp or version number than the origin image to be replaced among the references of the vulnerable derived image. More specifically, in at least some implementations, the current version of the origin image may be the version of the origin image (i.e., an instance of an image having the identifier of the origin image) having the most recent timestamp or version (e.g., having the highest value for timestamp or version number).

In particular, in an embodiment, the current version of the origin image is scanned with respect to the vulnerability identified in the derived image. That is, the current version of the origin image may be scanned in order to determine whether the current version has the vulnerability of the old version of the origin image which is to be replaced. In other words, such a check may be performed in order to confirm that replacing the reference to the old origin image with a reference to this current version will remediate the vulnerability of the derived image. Otherwise (i.e., if such replacement will not fix the vulnerability), a notification may be generated and sent to a developer in order to notify the developer that a new version of the origin image should be created and deployed in order to avoid the vulnerability. In a further embodiment, when such a notification is sent, a notification that a fixed version of the origin image has been created may be received from the developer, and this fixed version may be scanned in order to confirm that the fixed version avoids the vulnerability. If the fixed version resolves the vulnerability, execution may continue using the fixed version as the current version of the origin image to be referenced instead of the old origin image.

In a further embodiment, the current version of the origin image to be used as the new origin image may be scanned for additional vulnerabilities such as, but not limited to, a set of vulnerabilities in a list of vulnerabilities to be scanned for new origin images. Such a list may be a predetermined list of vulnerabilities. In yet a further embodiment, a risk analysis may be performed for any additional vulnerabilities that are detected in the current version of the origin image. As a non-limiting example, a risk score may be determined based on the vulnerabilities which would be introduced (e.g., based on predetermined risk values assigned to each vulnerability, which may be weighted), and a current version of an origin image which has a risk score above a predetermined threshold may not be utilized in the rebuilt container image. In some implementations, when a current version of the origin image has a risk score above such a threshold, a notification may be generated and sent to a developer indicating that the current version of the origin image should be updated in order to fix some or all of the vulnerabilities, and a fixed version of the origin image may be utilized during subsequent version instead of the current version which has a risk score above the threshold.

In some embodiments, multiple candidates for new origin images to be used may be identified. In some such embodiments, each candidate new origin image may be scanned for vulnerabilities, and the new origin image to be used may be selected from among the candidate origin images based on such a scan. In a further embodiment, a risk score may be generated for each candidate origin image as discussed above. In yet a further embodiment, the candidate origin image with the lowest risk score or otherwise meeting certain criteria including having a risk score below a threshold may be selected as the new origin image to be utilized.

Additionally, it is noted that the current version of the origin image may be stored in a location (e.g., in a repository) in which the origin image cannot be accessed directly by the system performing the method of FIG. 3 (e.g., the container remediator 150, FIG. 1). To this end, in some embodiments, a repository or other source of an origin image which might be utilized as the current version of the origin image (i.e., the new origin image in subsequent processing)

At S370, the vulnerable derived image is rebuilt. In an embodiment, rebuilding the vulnerable derived image may include obtaining contents of the applicable origin image and pushing the container image including these contents to a computing environment in which the software container is to be deployed. When the origin image is identified via a location and a current version of the origin image at that location lacks the vulnerability, rebuilding the vulnerable image (without explicitly modifying any lines of code related to the vulnerable image) may fix the vulnerability.

When the origin image is identified as a specific origin image and a current version of the origin image which lacks the vulnerability has been identified, rebuilding the vulnerable derived image may further include modifying a code line (e.g., a code line in a build file of the vulnerable derived image) to point to or otherwise reference the current version of the origin image, thereby replacing the old version of the origin image (old origin image) with the current version of the origin image (new origin image). As a non-limiting example, a line of code including a "FROM" command may be modified to include a reference to the new origin image after the "FROM" command such that, when the derived image is rebuilt based on the build file including this modified code line, the derived image will be rebuilt so as to replace the contents of the old origin image with the contents of the new origin image, thereby avoiding the vulnerability in the software container realized by executing the rebuilt derived image.

At S380, the vulnerable derived image is removed. In an embodiment, removing the vulnerable derived image includes deleting the vulnerable derived image, dismissing the software container realized using the vulnerable derived image, or both. Removing the vulnerable derived image and deploying the rebuilt derived image effectively allows for replacing the vulnerable derived image with the rebuilt derived image (and, consequently, for replacing any vulnerable origin image of the vulnerable derived image with a new, non-vulnerable origin image).

At S390, the rebuilt derived image is deployed. Deploying the rebuilt image may include, but is not limited to, pushing the rebuilt image to a repository (e.g., the container repository 120, FIG. 1) for use in executing a containerized application. In some embodiments, the rebuilt image may be run, thereby deploying the software container and realizing the containerized application.

Figure 4:
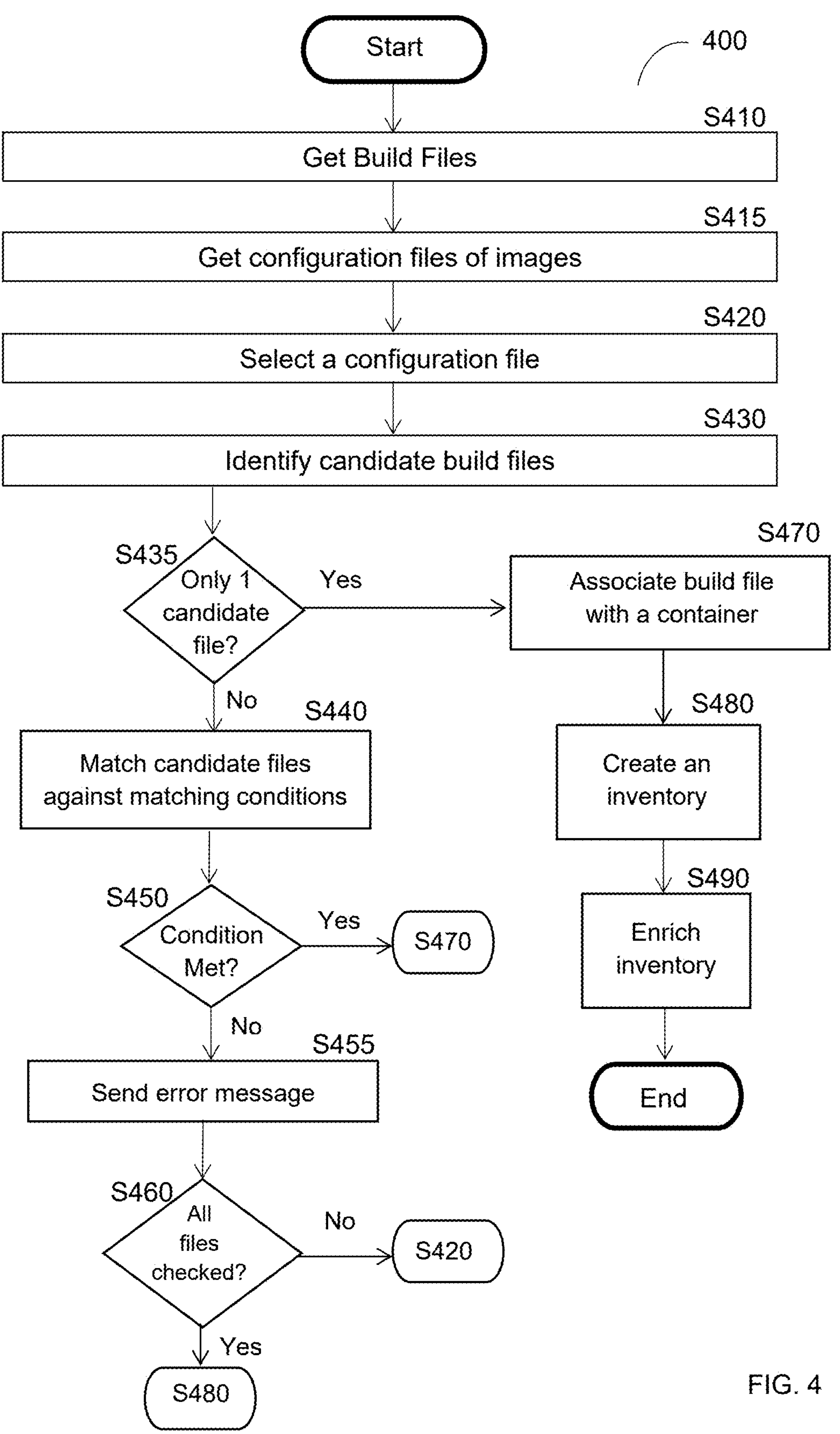
FIG. 4 is a flowchart illustrating a method for software container attribution according to an embodiment.

FIG. 4 is a flowchart 400 illustrating a method for software container attribution according to an embodiment. In an embodiment, the method is performed by the container remediator 150, FIG. 1.

At S410, build files of container images are retrieved from a code repository. A build file (e.g., a Dockerfile), when executed, causes the creation of a container image of a software image. In an embodiment, build files of the entire development history are retrieved.

At S415, configuration files of container images are retrieved from a container repository. A configuration file may include configuration information for layers of a container image of a software container. In an embodiment, the build files and configuration files are of container images of respective software containers executed in a production environment of an organization. It should be noted that S410 and S415 can be executed in parallel or in a reverse order without departing from the scope of the disclosure.

At S420, a configuration file is selected from among the retrieved configuration files and de-compiled. The de-compilation of a configuration file includes removing all information that cannot be utilized for the matching and association of build files. For example, all hash values are removed from the selected configuration file.

At S430, at least one candidate build file is identified for the selected (and de-compiled) configuration file. A candidate build file may be identified by matching the commands in the build files to a selected de-complied configuration file. For example, if a "build_file_1" includes the following commands:

```
build_file_1:
  FROM scratch
  RUN yum install -y httpd
  CMD ["echo", "Web Image created"]
And a selected configuration file A' includes the following commands:
  RUN yum install -y httpd
  CMD ["echo", "Web Image created"]
```

Then, the "build_file_1" is a candidate as the commands (RUN, CMD) in both files are the same.

Multiple candidates can be identified for numerous reasons. For example, if the user (e.g., programmer) saved the same build file in multiple locations (folders), the command and their variables do not exactly match due to compilation changes or when a container image is composed using a number of build files.

In an embodiment, the identification of candidate build files is performed based on one more or text search techniques. Such techniques may include using regulation expression, string matches, indexing, wild-card searches, and the like. It should be noted that, in at least some embodiments, all commands from the build file are matched to all commands in the selected configuration file, excluding the excluded commands. To this end, a configuration file may be searched for all commands starting from the last command in the file until the first excluded command is encountered.

At S435, it is checked if there is only one candidate build file and, if so, execution proceeds with S470, at which the candidate build file is determined to match the selected de-complied configuration file, and the two files (build and configuration) are associated with each other. If S435 results with a "No" answer (i.e., there are multiple candidate build files), execution continues with S440.

At S440, all candidate build files are checked to determine if they meet at least one matching condition. As noted above, the matching conditions include, but are not limited to, similarity; creation time; number of commands; and hierarchical matching.

At S450, it is checked if at least one matching condition is satisfied; if so, execution continues with S470, where the build file is determined to match the selected (de-complied) configuration file, and the two files (build and configuration) are associated with each other. Otherwise, at S455, an error message is sent that no build file was found for the selected configuration file.

At S460, it is checked if all configuration files have been checked; if so, execution continues with S480; otherwise, execution returns to S420 wherein a new configuration file is selected.

When there is only one candidate build file, execution may proceed with S480 after S470. At S480, an inventory including all configuration files and their associated build files is created. That is, the inventory provides mappings between container images and their respective build files. As noted above, the inventory may be a data structure, such as a tree structure stored in a memory, storage, or database.

At S490, the inventory is enriched. To this end, the container layers of each container image designated in inventory is associated with a respective code line in the build file. Such code line is a command for creating the layer. In addition, each container image is enriched with any detected or reported vulnerability on a specific container image or layer within the image.

Figure 5:
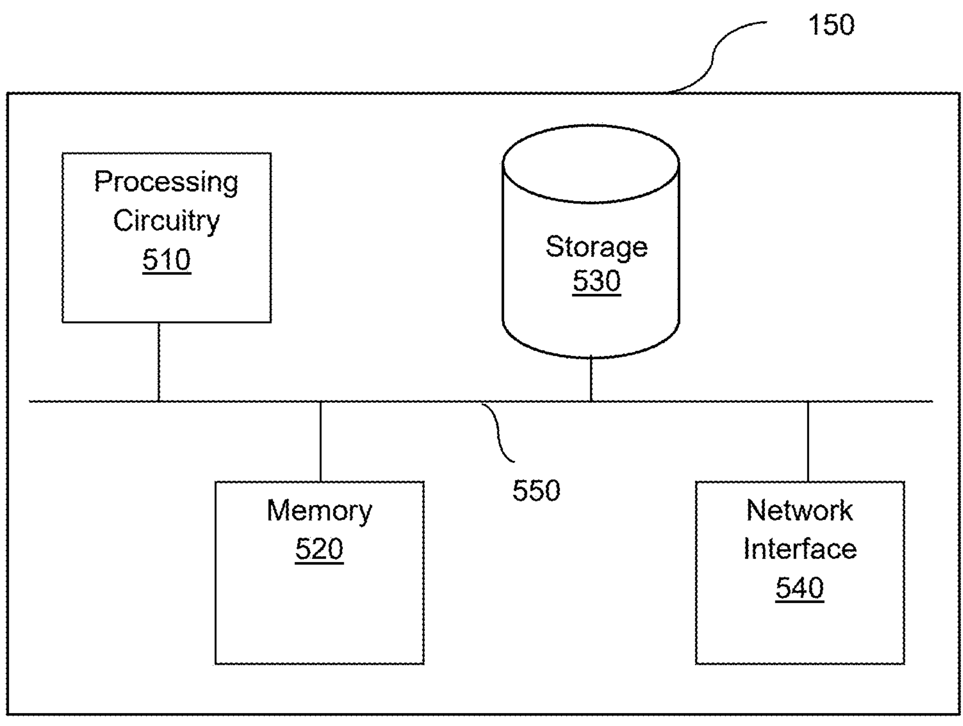
FIG. 5 is a schematic diagram of a container remediator according to an embodiment.

FIG. 5 is an example schematic diagram of a container remediator 150 according to an embodiment. The container remediator 150 includes a processing circuitry 510 coupled to a memory 520, a storage 530, and a network interface 540. In an embodiment, the components of the container remediator 150 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the container remediator 150 to communicate with other systems, devices, components, applications, or other hardware or software components, for example as described herein.

It should be understood that the embodiments described herein are not limited to the specific architecture illustrated in FIG. 5, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for software container remediation, comprising:

determining that a vulnerability of a software container resides in a first origin image of the software container at least partially by identifying a plurality of derived container images referencing the first origin image having the vulnerability, wherein a first derived container image of the plurality of derived container images is used to run the software container; and rebuilding the first derived container image using contents of a second origin image, wherein the second origin image avoids the vulnerability.

2. The method of claim 1, further comprising:

identifying a vulnerable line of code in a file of the software container, wherein the vulnerable line of code includes a reference to the first origin image; and modifying the vulnerable line of code to include a reference to the second origin image, wherein the first derived container image is rebuilt using the modified line of code.

3. The method of claim 2, wherein the file of the software container is a build file.

4. The method of claim 3, wherein the vulnerability is a first vulnerability of a plurality of vulnerabilities, wherein the second origin image is scanned with respect to the plurality of vulnerabilities, further comprising:

determining that a risk score for the second origin image is below a threshold based on at least one second vulnerability of the plurality of vulnerabilities detected for the second origin image.

5. The method of claim 1, further comprising:

scanning the second origin image to verify that the second origin image avoids the vulnerability.

6. The method of claim 1, further comprising:

copying the first derived container image from a repository in which the first derived container image is stored, wherein the rebuilt first derived container image is rebuilt using the copied first derived container image.

7. The method of claim 1, further comprising:

creating a hierarchy of container images, wherein the hierarchy of container images includes the plurality of derived container images, wherein the plurality of derived container images referencing the first origin image having the vulnerability is identified based on the hierarchy of container images.

8. The method of claim 1, further comprising:

recursively analyzing at least one ancestor container image of the first derived container image to determine whether the vulnerability resides in a respective origin image of each of the at least one ancestor container image; and rebuilding each of the at least one ancestor container image for which the vulnerability is determined to reside in the respective origin image.

9. The method of claim 1, further comprising:

deploying a rebuilt first derived container image.

10. A non-transitory computer readable medium having stored thereon instructions for causing a processing circuitry to execute a process, the process comprising:

determining that a vulnerability of a software container resides in a first origin image of the software container at least partially by identifying a plurality of derived container images referencing the first origin image having the vulnerability, wherein a first derived container image of the plurality of derived container images is used to run the software container; and rebuilding the first derived container image using contents of a second origin image, wherein the second origin image avoids the vulnerability.

11. A system for software container remediation, comprising:

a processing circuitry; and a memory, the memory containing instructions that, when executed by the processing circuitry, configure the system to:

determine that a vulnerability of a software container resides in a first origin image of the software container at least partially by identifying a plurality of derived container images referencing the first origin image having the vulnerability, wherein a first derived container image of the plurality of derived container images is used to run the software container; and rebuild the first derived container image using contents of a second origin image, wherein the second origin image avoids the vulnerability.

12. The system of claim 11, wherein the system is further configured to:

identify a vulnerable line of code in a file of the software container, wherein the vulnerable line of code includes a reference to the first origin image; and modify the vulnerable line of code to include a reference to the second origin image, wherein the first derived container image is rebuilt using the modified line of code.

13. The system of claim 12, wherein the file of the software container is a build file.

14. The system of claim 13, wherein the vulnerability is a first vulnerability of a plurality of vulnerabilities, wherein the second origin image is scanned with respect to the plurality of vulnerabilities, wherein the system is further configured to:

determine that a risk score for the second origin image is below a threshold based on at least one second vulnerability of the plurality of vulnerabilities detected for the second origin image.

15. The system of claim 11, wherein the system is further configured to:

scan the second origin image to verify that the second origin image avoids the vulnerability.

16. The system of claim 11, wherein the system is further configured to:

copy the first derived container image from a repository in which the first derived container image is stored, wherein the rebuilt first derived container image is rebuilt using the copied first derived container image.

17. The system of claim 11, wherein the system is further configured to:

create a hierarchy of container images, wherein the hierarchy of container images includes the plurality of derived container images, wherein the plurality of derived container images referencing the first origin image having the vulnerability is identified based on the hierarchy of container images.

18. The system of claim 11, wherein the system is further configured to:

recursively analyze at least one ancestor container image of the first derived container image to determine whether the vulnerability resides in a respective origin image of each of the at least one ancestor container image; and rebuild each of the at least one ancestor container image for which the vulnerability is determined to reside in the respective origin image.

19. The system of claim 11, wherein the system is further configured to:

deploy the rebuilt first derived container image.

* * * * *